United States Patent
Fischl et al.

(10) Patent No.: US 11,608,865 B2
(45) Date of Patent: Mar. 21, 2023

(54) BRAKE CALIPER OF A DISC BRAKE AND DISC BRAKE

(71) Applicant: KNORR-BREMSE Systeme fuer Nutzfahrzeuge GmbH, Munich (DE)

(72) Inventors: Tobias Fischl, Munich (DE); Wolfgang Pritz, Munich (DE)

(73) Assignee: KNORR-BREMSE Systeme fuer Nutzfahrzeuge GmbH, Munich (DE)

(*) Notice: Subject to any disclaimer, the term of this patent is extended or adjusted under 35 U.S.C. 154(b) by 244 days.

(21) Appl. No.: 17/274,633

(22) PCT Filed: Aug. 26, 2019

(86) PCT No.: PCT/EP2019/072726
§ 371 (c)(1),
(2) Date: Mar. 9, 2021

(87) PCT Pub. No.: WO2020/052954
PCT Pub. Date: Mar. 19, 2020

(65) Prior Publication Data
US 2022/0049750 A1    Feb. 17, 2022

(30) Foreign Application Priority Data
Sep. 10, 2018    (DE) .................... 10 2018 122 008.1

(51) Int. Cl.
*F16D 55/2265* (2006.01)
*F16D 65/00* (2006.01)
(Continued)

(52) U.S. Cl.
CPC ..... *F16D 65/0068* (2013.01); *F16D 55/2255* (2013.01); *F16D 2055/0016* (2013.01); *F16D 2125/64* (2013.01)

(58) Field of Classification Search
CPC ............ F16D 65/0068; F16D 55/2255; F16D 2055/0016; F16D 2125/64
(Continued)

(56) References Cited

U.S. PATENT DOCUMENTS 10,682,711 B2 * 6/2020 Flocke .................... F16D 65/18
2009/0236187 A1   9/2009 Bach et al.
(Continued)

FOREIGN PATENT DOCUMENTS

CN        101427044 A    5/2009
CN        105937567 A    9/2016
(Continued)

OTHER PUBLICATIONS

International Search Report (PCT/ISA/210) issued in PCT Application No. PCT/EP2019/072726 dated Nov. 15, 2019 with English translation (six (6) pages).
(Continued)

*Primary Examiner* — Christopher P Schwartz
(74) *Attorney, Agent, or Firm* — Crowell & Moring LLP

(57) ABSTRACT

A brake caliper, in particular a sliding caliper, of a disc brake of a commercial vehicle includes a brake application portion, which extends around a holding space for holding at least one brake application device; a caliper back; two tension struts, which run substantially parallel and at a distance to one another and connect the brake application portion to the caliper back; a closure cover, which closes the holding space; and an interface for mounting a pivotable brake lever on the side of the brake application portion facing away from the closure cover. A mounting opening for inserting and removing brake pads is formed between the brake application portion, the caliper back and the tension struts. The ratio of the length of the brake application portion
(Continued)

to the sum of the length of the brake application portion and the length of a tension strut is between 0.4 and 0.3.

5 Claims, 4 Drawing Sheets

(51) Int. Cl.
    *F16D 55/2255*     (2006.01)
    *F16D 55/00*     (2006.01)
    *F16D 125/64*     (2012.01)

(58) Field of Classification Search
    USPC ...... 188/71.1, 72.1–72.4, 73.1, 73.39, 73.41, 188/73.42, 73.43, 73.46, 73.47, 369, 370
    See application file for complete search history.

(56) References Cited

U.S. PATENT DOCUMENTS

| | | |
|---|---|---|
| 2016/0258499 A1 | 9/2016 | Kloos |
| 2017/0159732 A1 | 6/2017 | Klinger et al. |
| 2017/0204903 A1 | 7/2017 | Klaas |
| 2019/0186566 A1* | 6/2019 | Howard .............. F16D 65/0068 |
| 2019/0203786 A1 | 7/2019 | Fischl et al. |
| 2019/0210121 A1 | 7/2019 | Flocke |

FOREIGN PATENT DOCUMENTS

| | | |
|---|---|---|
| CN | 106715947 A | 5/2017 |
| DE | 10 2011 103 963 B3 | 9/2012 |
| DE | 20 2014 010 485 U1 | 9/2015 |
| DE | 10 2014 112 241 A1 | 3/2016 |
| DE | 10 2014 115 766 A1 | 5/2016 |
| DE | 10 2016 115 176 A1 | 2/2018 |
| DE | 10 2016 116 793 A1 | 3/2018 |
| DE | 10 2016 218 410 A1 | 3/2018 |
| DE | 10 2016 120 478 A1 | 5/2018 |
| GB | 1 299 433 A | 12/1972 |

OTHER PUBLICATIONS

German-language Written Opinion (PCT/ISA/237) issued in PCT Application No. PCT/EP2019/072726 dated Nov. 15, 2019 (five (5) pages).

German-language Office Action issued in German Application No. 10 2018 122 008.1 dated Aug. 2, 2019 (eight (8) pages).

Chinese-language Office Action issued in Chinese Application No. 201980059019.4 dated Mar. 2, 2022 with English translation (eight (8) pages).

* cited by examiner

Prior art

US 11,608,865 B2

BRAKE CALIPER OF A DISC BRAKE AND DISC BRAKE

BACKGROUND AND SUMMARY OF THE INVENTION

The present invention relates to a brake caliper, in particular a sliding caliper, for a disc brake of a commercial vehicle, and to a disc brake.

Brake calipers serve as components of disc brakes, in particular those for commercial vehicles, primarily for accommodating functional parts required for braking operation.

These include, in particular, an application device with a threaded rod unit having a thrust piece which, during a braking operation, presses a brake pad mounted in a brake carrier against a brake disc of the disc brake.

In this process, the threaded rod unit is moved in the disc direction. As soon as the brake pad on the application side is in contact with the brake disc, the brake caliper is displaced in such a way by the counterforce produced that a second brake pad arranged in the region of a caliper back is pushed in the direction of the brake disc. As soon as this reaction-side brake pad also touches the disc, a braking effect is produced.

To ensure a constant release clearance between the brake pads and the brake disc, the application unit is furthermore extended further in the direction of the brake disc as the wear on the brake pads increases.

In this arrangement, the application force required for an application process is generated via a brake lever mounted eccentrically with respect to the threaded rod unit. The brake lever itself is usually actuated by a compressed-air cylinder, which is fastened on a side of an application section of the brake caliper facing away from the brake disc, wherein this application section has a holding space for holding at least one application device containing the abovementioned threaded rod unit.

In this case, the entire application force is supported by the brake caliper. During this process, the brake caliper is deformed on account of the flow of force which passes through parts of the application section, the caliper back and, in particular, the tension struts.

Owing to the space available, the tension struts must be thin-walled and have a small cross-section. It is therefore necessary to distribute the concentration of the stresses occurring during a braking operation by suitable geometric curves of the brake caliper in such a way that a long service life of the brake caliper can be ensured.

In order to mount the components of the application device in the application section, said device is designed with an opening which is closed by a base plate after the mounting of the components.

It is an object of the present invention to improve a brake caliper in such a way that the stresses occurring during a braking operation are further reduced in order to increase the service life of the brake caliper and at the same time maintain a high stiffness in order to achieve the required braking torque.

This object is achieved by a brake caliper, in particular a sliding caliper, of a disc brake of a commercial vehicle, as well as by a disc brake, in particular for a commercial vehicle, having the features of the independent claims.

The brake caliper according to the invention has an application section, which extends around a holding space for holding at least one application device. The brake caliper furthermore has a caliper back and two tension struts, which run substantially parallel and at a distance with respect to one another and connect the application section to the caliper back.

The brake caliper furthermore has a closure cover, which closes the holding space, and an interface for mounting a pivotable brake lever on the side of the application section facing away from the closure cover.

A mounting opening for inserting and removing brake pads is formed between the application section, the caliper back and the tension struts.

In this arrangement, the ratio of the length of the application section to the sum of the length of the application section and the length of a tension strut is between 0.4 and 0.3.

By virtue of this length ratio, in which the tension struts are longer relative to the application section as compared to brake calipers known from the prior art, a greater deformation of the tension struts during a braking operation is made possible, leading to a reduction in the stresses occurring in the brake caliper.

However, the longer design of the tension struts leads to a reduction in the overall stiffness of the brake caliper above a certain length ratio, thus limiting the range of the optimum ratio between the length of the application section and the sum of the length of the application section and the tension strut.

Advantageous variant embodiments of the invention form the subject matter of the dependent claims.

In the absence of a preferred variant embodiment, the ratio of the length of the application section to the sum of the length of the application section and the length of a tension strut is between 0.38 and 0.36.

This ratio results in optimal stress reduction while maintaining high brake caliper stiffness.

According to another preferred variant embodiment, the interface for mounting the brake lever has a cylindrical pin.

In prior art calipers, the brake lever is usually mounted by means of a needle bearing, and therefore the mounting of the brake lever by means of a cylindrical pin makes it possible to increase the wall thickness to the interface, which overall shortens the total support length of the brake caliper.

Further advantages of the brake caliper according to the invention consist in the possibility of being able to use a less expensive, high-strength casting material for the brake caliper.

Here, the longer service life of the brake caliper achieved by the geometry according to the invention is achieved without additional material for casting the brake caliper.

The disc brake according to the invention for a commercial vehicle has a brake disc, a brake caliper fitting over the brake disc, and a brake carrier fitting around the brake disc. Brake pads are mounted in the brake carrier on both sides of the brake disc. The disc brake furthermore has an application device, by means of which the brake pads can be pressed against the brake disc, and a brake lever mounted on the brake caliper. In this case, the brake caliper is designed as described above.

Preferred exemplary embodiments are described in more detail below with reference to the following drawings.

In the following description of the figures, terms such as top, bottom, left, right, front, rear, etc. refer exclusively to the exemplary illustration and position of the brake caliper, brake disc, brake pads, application section, caliper back, tension strut and the like selected in the respective figures. These terms are not to be understood as restrictive, i.e. these references may change due to different working positions or mirror-symmetrical design or the like.

DETAILED DESCRIPTION OF THE DRAWINGS

Figure 1:
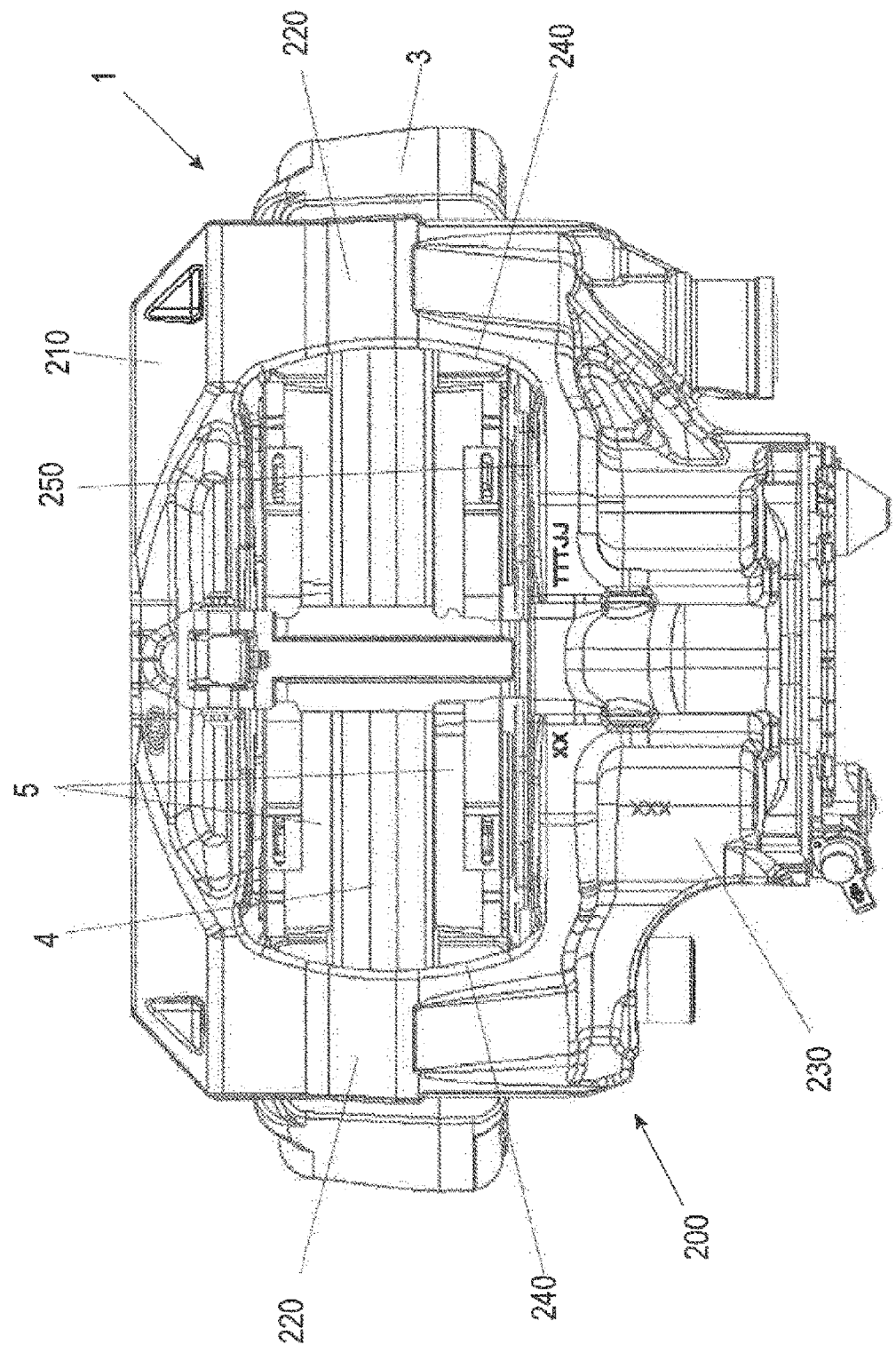
FIG. 1 shows a schematic plan view of a disc brake with brake caliper, brake disc and brake carrier according to the prior art.

In FIG. 1, reference sign 1 denotes a disc brake of the kind known in principle from the prior art.

The disc brake 1 has a brake disc 4, a brake caliper 200 fitting over the brake disc 4, and a brake carrier 3 fitting around the brake disc 4. Brake pads 5 are mounted in the brake carrier 3 on both sides of the brake disc 4.

In this arrangement, the brake caliper 200 essentially comprises a caliper back 210, an application section 230, which extends around a holding space for holding at least one application device, and two tension struts 220, which run substantially parallel and at a distance with respect to one another and connect the application section 230 to the caliper back 210.

An interface 260 for mounting a pivotable brake lever is formed on the side of the application section 230 facing away from the brake disc 4 and is pivoted by a tappet projecting from a brake cylinder (not shown here) when the disc brake is actuated.

Figure 3:
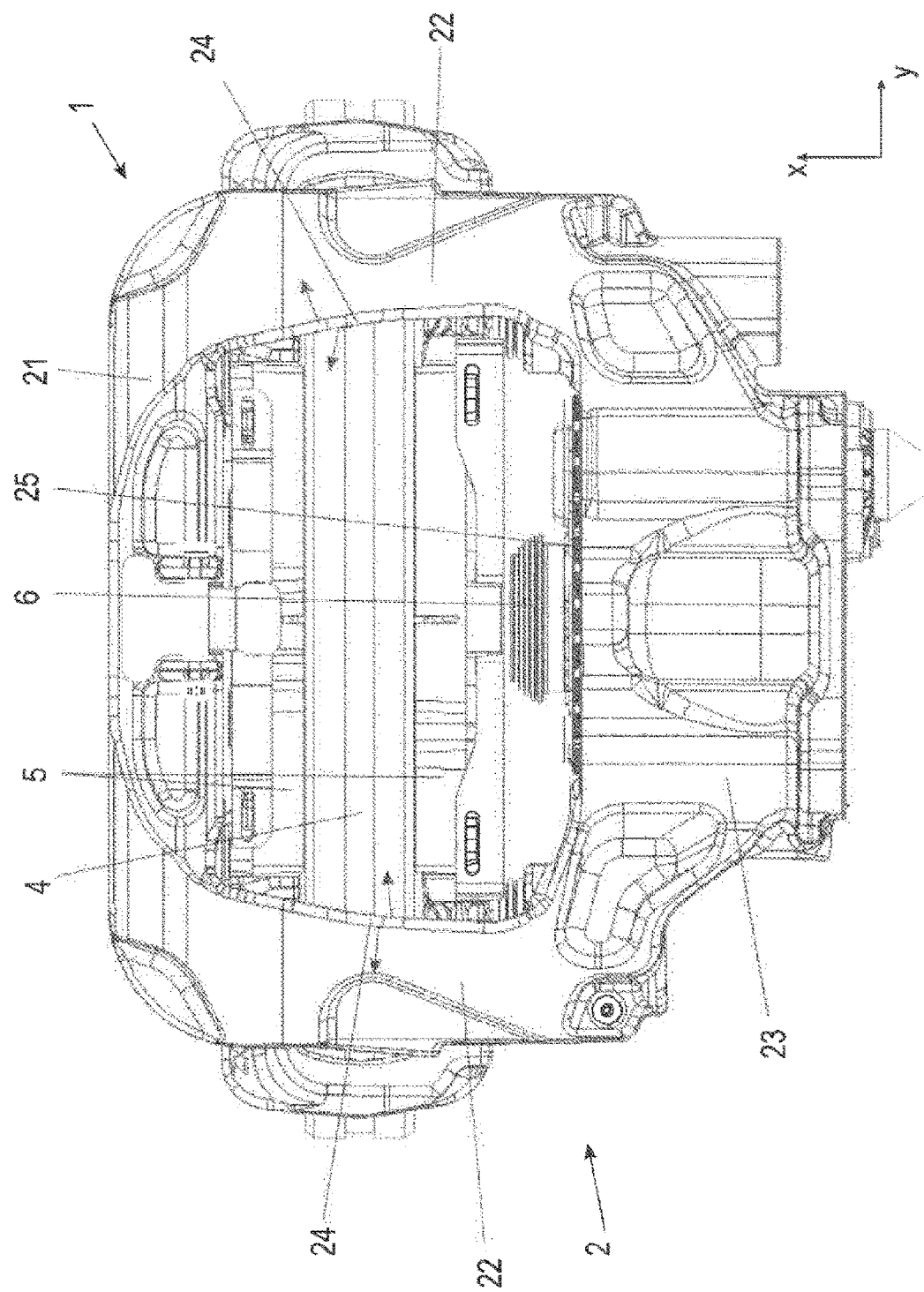
FIGS. 3 and 4 show illustrations corresponding to FIGS. 1 and 2 of a disc brake and a brake caliper according to a preferred variant embodiment of the invention.

FIG. 3 shows a disc brake 1 according to a variant embodiment of the invention.

This disc brake 1 is also constructed in a substantially similar manner to the disc brake described in FIG. 1, with a brake disc 4, a brake caliper 2 fitting over the brake disc 4, a brake carrier 3 fitting around the brake disc 4, as well as brake pads 5 mounted on the brake carrier 3 on both sides of the brake disc 4, and an application device 6, by means of which the brake pads 5 can be pressed against the brake disc 4 in a direction x parallel to the axis of rotation of the brake disc 4.

As can furthermore be seen in FIGS. 1 and 3, the holding space for holding the application device 6 is closed off towards the brake pad 5 on the application side by a closure cover 25, wherein a part of the application unit which is indicated here by the reference sign 6, in the form of a threaded rod unit, projects through an opening in the closure cover 25, 250 in the direction of the brake pad 5 on the application side.

Figure 2:
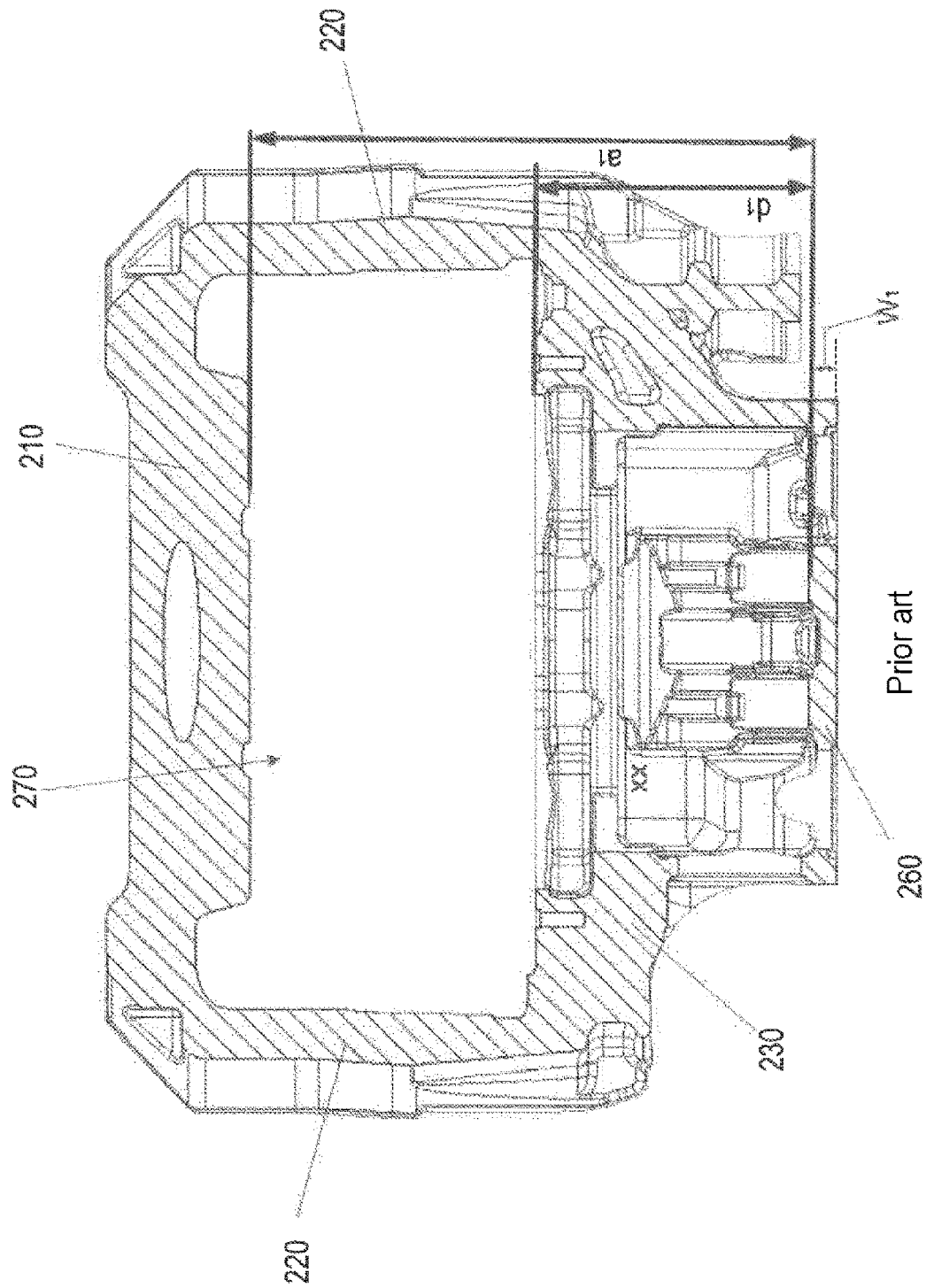
FIG. 2 shows a schematic sectional view of the prior art brake caliper shown in FIG. 1 illustrating the ratio of the length of the application section to the sum of the length of the application section and the length of a tension strut of the brake caliper.
Figure 4:
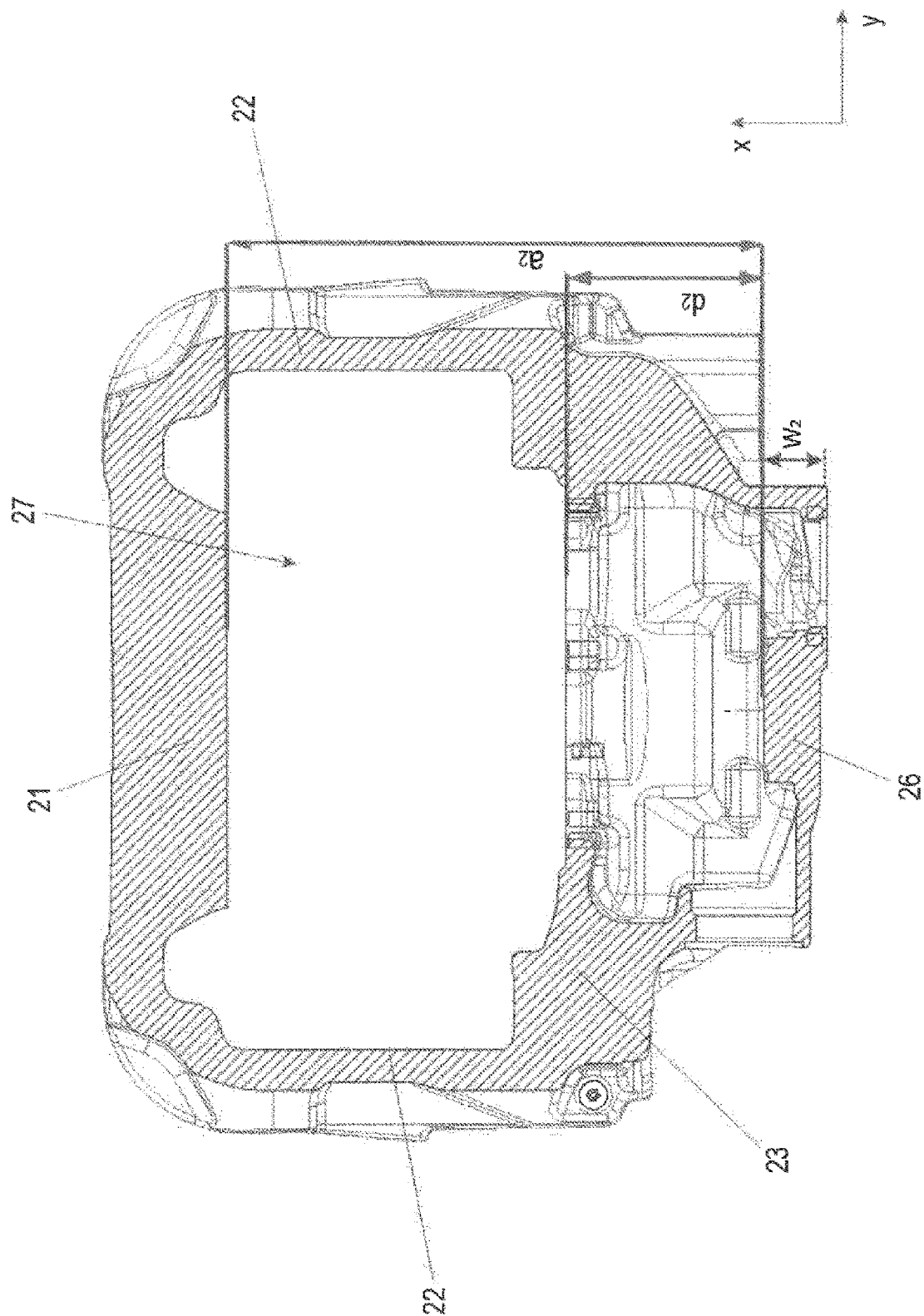

As a comparison of FIGS. 1 and 3 and FIGS. 2 and 4 shows (FIGS. 2 and 4 show respective sectional views of the brake caliper shown in FIGS. 1 and 3), in the brake caliper 2 according to FIGS. 3 and 4, the tension struts 22 are of longer design than the tension struts 220 of the brake caliper 200 known from the prior art.

In FIGS. 2 and 4, the reference signs $a_1$, $a_2$ designate the sum of the length of the application section 23, 230 and the length of the tension strut 22, 220 on the right in the drawing, while the designation $d_1$ designates the length of the application section 230 and $d_2$ designates the length of the application section 23.

While the ratio of the length $d_2$ of the application section 23 to the sum $a_2$ of the length of the application section 23 and the length of a tension strut 22 is between 0.4 and 0.3, particularly preferably between 0.38 and 0.36, the corresponding ratio in the case of the brake caliper known from the prior art is approximately 0.5, i.e. the length of the application section 23 corresponds approximately to the length of the tension struts 220.

As a result of the extension of the tension struts and the associated shortening of the length of the application section 23, the possible deformation of the tension struts 22 in the region of a rim 24 facing the mounting opening 27 is significantly increased as compared with the tension struts 220 of the brake caliper 200 according to the prior art, leading to a reduction of stresses occurring within the brake caliper during a braking operation and thus reducing the risk of cracks forming within the brake caliper.

Moreover, the enlargement of the brake caliper mounting opening 27 formed by the application section 23, the caliper back 21 and the tension struts 22 facilitates the insertion and removal of the brake pads 5.

As can furthermore be seen from a comparison of FIGS. 2 and 4, the wall thickness $w_2$ of the brake caliper 2 in the region of an interface 26 for mounting a brake lever is designed to be enlarged in comparison with the wall thickness $w_1$ of the brake caliper 200 known from the prior art, as a result of which the total support length of the brake caliper, i.e. the sum $a_2$ of the length of the application section 23 and the length of the tension strut 22, is likewise shortened.

Here, the interface 26 for mounting a brake lever preferably has a cylindrical pin with a small diameter. In the case of the brake calipers known from the prior art, on the other hand, needle bearings with a large diameter are usually used which, owing to the limited installation space in the vehicle, require a thinner wall thickness w1 of the interface of the brake caliper 200 and thus increase the total support length of the brake caliper 200.

LIST OF REFERENCE SIGNS 1 disc brake
2 brake caliper
21 caliper back
22 tension strut
23 application section
24 rim
25 closure cover
26 interface
27 assembly opening
3 brake carrier
4 brake disc
5 brake pad
6 application device
7 adjusting device
200 brake caliper
210 caliper back
220 tension strut
230 application section
240 rim
250 closure cover
260 interface
270 assembly opening
$a_1$ sum of the length of the application section and the length of a tension strut
$a_2$ sum of the length of the application section and the length of a tension strut $d_1$ length of the application section
$d_2$ length of the application section
$w_1$ wall thickness of the interface
$w_2$ wall thickness of the interface

What is claimed is:

1. A brake caliper of a disc brake of a commercial vehicle, comprising:
    an application section, which extends around a holding space for holding at least one application device;
    a caliper back;
    two tension struts, which run substantially parallel and at a distance with respect to one another and connect the application section to the caliper back;
    a closure cover, which closes the holding space; and
    an interface for mounting a pivotable brake lever on a side of the application section facing away from the closure cover,
    wherein a mounting opening for inserting and removing brake pads is formed between the application section, the caliper back and the tension struts, and
    wherein a ratio of the length of the application section to the sum of the length of the application section and the length of a tension strut is between 0.4 and 0.3.

2. The brake caliper as claimed in claim 1, wherein the ratio of the length of the application section to the sum of the length of the application section and the length of a tension strut is between 0.38 and 0.36.

3. The brake caliper as claimed in claim 1, wherein the interface for mounting the brake lever has a cylindrical pin.

4. The brake caliper as claimed in claim 1, wherein the caliper is configured as a sliding caliper.

5. A disc brake for a commercial vehicle, comprising:
    a brake disc;
    a brake caliper fitting over the brake disc;
    a brake carrier fitting around the brake disc, wherein the brake carrier is configured to mount brake pads in the brake carrier on both sides of the brake disc;
    an application device, by which the brake pads are pressable against the brake disc; and
    a brake lever mounted on the brake caliper for displacing the application device, wherein
    the brake caliper comprises:
    an application section, which extends around a holding space for holding the application device;
    a caliper back;
    two tension struts, which run substantially parallel and at a distance with respect to one another and connect the application section to the caliper back;
    a closure cover, which closes the holding space;
    an interface for mounting a pivotable brake lever on the side of the application section facing away from the closure cover,
    wherein a mounting opening for inserting and removing the brake pads is formed between the application section, the caliper back and the tension struts, and
    wherein a ratio of the length of the application section to the sum of the length of the application section and the length of a tension strut is between 0.4 and 0.3.

* * * * *